Figure 1:
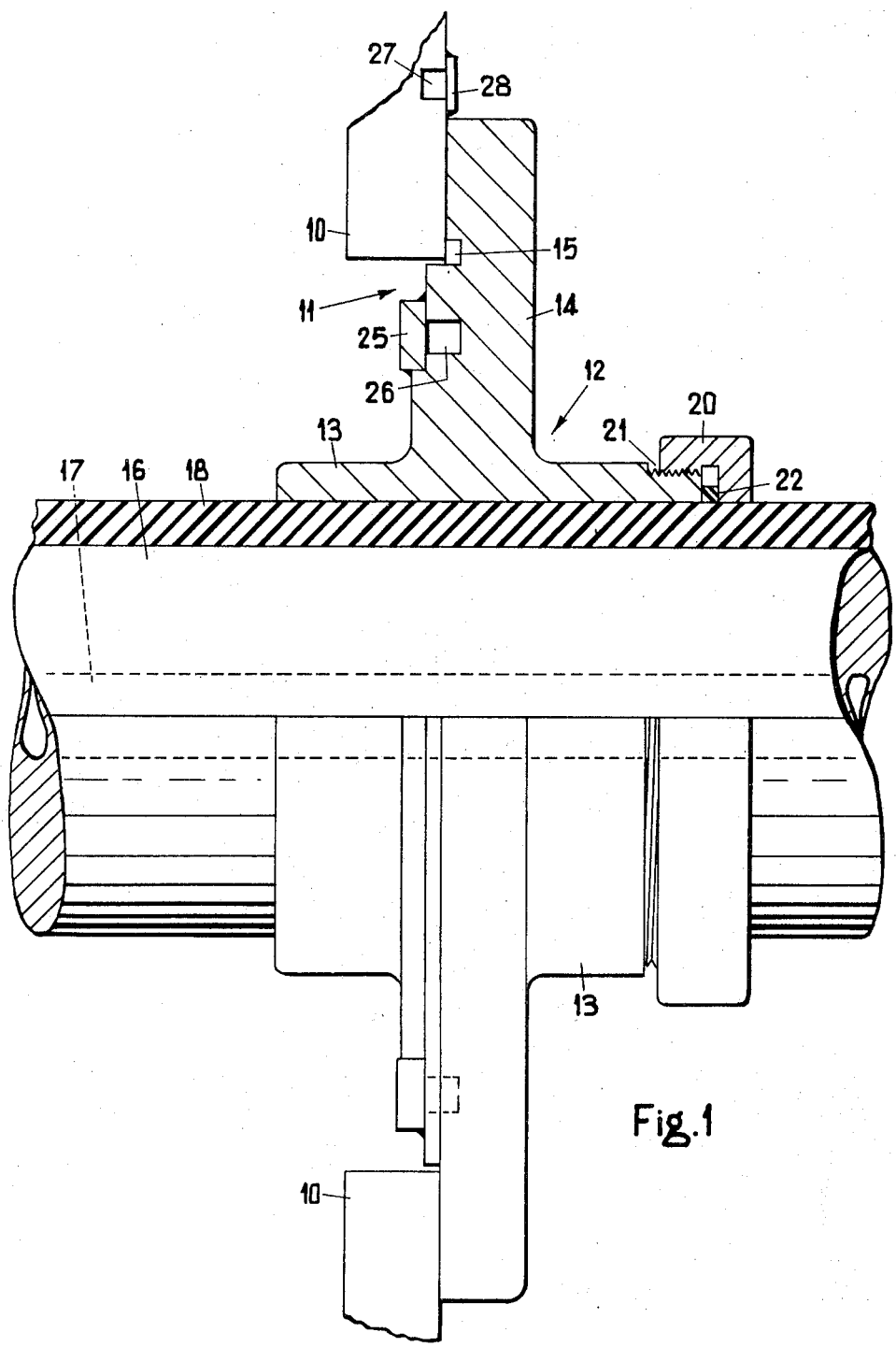

United States Patent [19]
Heard

[11] 3,829,723
[45] Aug. 13, 1974

[54] ALTERNATING CURRENT DYNAMO ELECTRIC MACHINES

[75] Inventor: Jeffery Gerald Heard, Stafford, England

[73] Assignee: The English Electric Company Limited, London, England

[22] Filed: Oct. 10, 1972

[21] Appl. No.: 296,101

[52] U.S. Cl. ............... 310/54, 174/15 BH, 310/65
[51] Int. Cl. ..................... H02k 9/00, H02k 9/20
[58] Field of Search ........... 310/52, 54, 64, 65, 260, 310/53, 55–57; 174/15 BH, 16 BH

[56] References Cited
UNITED STATES PATENTS

| | | | |
|---|---|---|---|
| 2,742,582 | 4/1956 | Bahn et al. | 174/15 BH |
| 3,092,741 | 6/1963 | Horsley | 310/64 X |
| 3,465,183 | 9/1969 | Wallenstein | 310/64 X |

*Primary Examiner*—J. D. Miller
*Assistant Examiner*—Robert J. Hickey
*Attorney, Agent, or Firm*—Kirschstein, Kirschstein, Ottinger & Frank

[57] ABSTRACT

A dynamo electric machine, especially a large alternating current hydrogen-cooled generator, in which each winding terminal comprises an electrically insulated conductor secured and located in an aperture in the machine housing by means of a metal fitting, includes at least one duct in good thermally conductive relationship with the fitting for the passage of a fluid coolant for cooling the fitting.

5 Claims, 4 Drawing Figures

ALTERNATING CURRENT DYNAMO ELECTRIC MACHINES

This invention relates to alternating current dynamo electric machines especially large alternating current generators.

With large alternating current generators of the kind at present being developed and manufactured the amount of power which is generated is so great that the armature terminal conductors have to carry such large currents that excessive heating of adjacent metal parts by induced eddy currents can occur.

For example, in a large generator of the kind which has an enclosing housing and in which hydrogen is circulated for cooling parts of the machine the armature terminal conductors have to be secured in the housing of the machine in a gas-tight manner for which metal fittings are preferable, and consequently these fittings can become heated to a degree which is not tolerable. In addition, eddy currents induced in metal parts of the machine housing adjacent the terminal conductors can also cause the housing, or at least parts thereof, to become overheated.

According to the present invention there is provided a dynamo electric machine in which each winding terminal for carrying alternating current comprises an electrically insulated conductor secured and located in an aperture in the machine housing by a metal fitting, and including at least one duct in good thermal relationship with the fitting for providing a flow path for a cooling medium for cooling the fitting.

In one embodiment of the invention the fitting comprises a flanged member having an axially extending part with a central bore in which the insulated conductor is secured and a radially extending flange for securing the fitting in an aperture in the machine housing, including means for defining at least one duct for the passage of cooling fluid about the flanges.

In another embodiment of the invention means are provided for defining at least one duct associated with the housing and at least one duct associated with the fitting.

The or each duct may be directly associated with the fitting and preferably each such duct is formed in the fitting.

Alternatively the or each duct is associated with the machine housing closely adjacent the flange of the fitting, and preferably the or each such duct is formed in the housing.

One embodiment of the invention will be described, by way of example, with reference to the accompanying drawing which shows part of a terminal suitable for a large alternating current generator of the kind in which hydrogen is circulated within the housing.

In the drawing:

FIG. 1 which is partly in section shows part of the terminal conductor fitted into a part of the housing of the generator.

Figure 2:
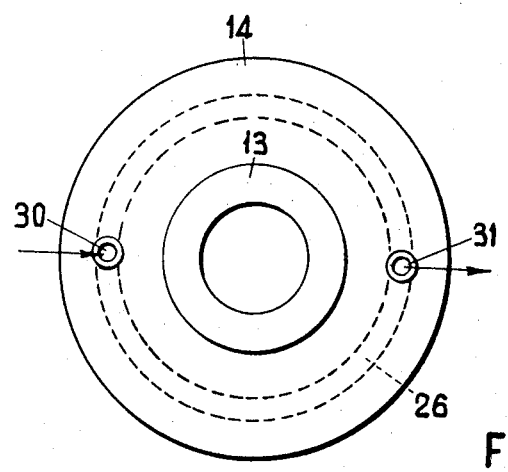

FIG. 2 diagrammatically shows part of the arrangement of FIG. 1, and

Figure 3:
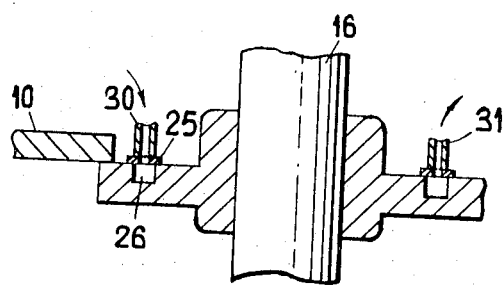
Figure 4:
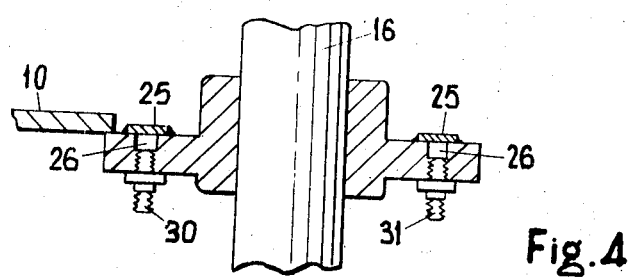

FIGS. 3 and 4 diagrammatically show modifications of the arrangement of FIGS. 1 and 2.

In FIG. 1 the reference numeral 10 indicates the machine housing which can in fact be part of a separate terminal chamber which communicates with the main body of the machine housing and which also contains hydrogen. An aperture 11 is provided in the housing and over this aperture is fitted a non-magnetic metal flanged fitting generally indicated 13 at 12. The fitting 12 has an axially extending part 13 and a radially extending flange 14 the outer edge of which is secured about the aperture 11 by means (not shown). The joint between the flange and the housing is gas-tight as is indicated by the use of a sealing ring 15.

The axially extending part 13 of the fitting has a central bore in which is secured a hollow conductor lead 16 which has a central bore 17 and the lead is surrounded by electrical insulation 18. The fitting 12 fits tightly about the insulation 18 and may thus conveniently be shrunk on to the insulated conductor. A cap nut 20 co-operates with a treaded portion 21 of the fitting 13 to provide a gas-tight seal by means of co-operating sealing means 22 within the cap nut. The central bore 17 of the conductor lead provides a path for the passage of a cooling medium for cooling the conductor, a fluid such as gas or water being caused to flow through the bore.

The flange 14 is formed with a circular groove over which is welded an annular plate 25 to define a circular duct 26 of rectangular cross section in the flange. The housing is shown with a similar form of circular duct 27 formed by a groove and co-operating annular plate 28.

FIG. 2 diagrammatically shows the circular duct 26 in the flange with a cooling fluid inlet 30 and a diametrically opposite outlet 31. Cooling fluid, preferably water, is supplied by means (not shown) to the inlet 30 where the cooling fluid divides into two paths to flow around the flange from which it is exhausted at the outlet 31.

FIG. 3 diagrammatically shows the inlet and outlet 30 and 31 as provided in the plate 25 so that the inlet and outlet are inside the machine housing.

FIG. 4 diagrammatically shows the inlet 30 and outlet 31 provided in the flange so that both the inlet and outlet 30 and 31 are outside of the machine housing.

If desired the inlet and outlet 30 and 31 can be disposed closely adjacent one another and a flow barrier provided in the duct between them. This arrangement provides a single duct in the flange which extends almost completely around the flange to provide an almost complete 360° circular cooling duct. With such an arrangement the cooling fluid inlet and outlet can be provided either inside or outside the machine housing as is described in relation to FIGS. 3 and 4.

The duct 27 in the housing is provided with a fluid inlet and outlet (not shown) and these may be arranged in any of the ways described in relation to the ducts described with reference to FIGS. 3 and 4.

In one modification of the invention a plurality of ducts associated with the fitting, or with the housing, or with both the fitting and the housing, are provided.

In another modification of the invention the ducts are provided by metal members of suitable cross section secured to at least one face of either the housing or the fitting. Such metal members may be tubes, members of channel section, or even L section.

A further possible modification of the invention would be to provide one or more ducts or part ducts between the housing 10 and the flange 14. Such an arrangement could be provided by one or more grooves in either the fitting or the housing with a co-operating surface of the housing or fitting, as the case may be, closing the or each groove to provide one or more ducts. However any such arrangement would almost certainly have the disadvantage of requiring the use of sealing rings to form fluid-tight ducts.

Whilst one or more ducts associated with the flanged metal fitting 12 may be considered the most suitable way of cooling the fitting it is not necessarily the most convenient way in which this cooling can be effected. For example, if one or more ducts are provided in the housing and no duct is provided in the fitting all of the connections and conduit necessary for conveying the cooling fluid to and from the or each duct are thus completely separate from the terminal so that not only is the terminal simpler but the cooling arrangement can be completed without the necessity of the terminal first being fitted in position. Similarly replacement of a terminal would be simpler.

Where the above described arrangement is used in conjunction with an alternating current generator having water cooled windings, such as for example water cooled stator windings, the supply of cooling water for the stator windings can also supply the cooling ducts for the terminal.

Whilst the invention has been described especially in relation to a large alternating current generator operating in an atmosphere of hydrogen the invention could obviously be used for any other form of dynamo electric machine in which heavy alternating currents are conveyed by terminal conductors which are closely associated with metal parts.

I claim:
1. A dynamo electric machine including
   A. an enclosing housing having at least one aperture therein,
   B. at least one winding terminal for carrying current to or from the machine,
   C. said winding terminal comprising
      i. an electrically insulated conductor extending through the aperture,
      ii. a metal fitting securing and locating the conductor in the aperture,
      iii. said fitting having a bore through which the conductor extends in a gas-tight manner,
      iv. said fitting having a radially exending flange secured to the housing around the apertures, and
   D. at least one duct in the flange of the fitting and in good thermal conductive relationship therewith for providing a flow path for a cooling medium for cooling the fitting.
2. A dynamo electric machine including
   A. an enclosing housing having at least one aperture therein,
   B. at least one winding terminal for carrying current to or from the machine,
   C. said winding terminal comprising
      i. an electrically insulated conductor extending through the aperture,
      ii. a metal fitting securing and locating the conductor in the aperture,
      iii. said fitting having a bore through which the conductor extends in a gas-tight manner,
      iv. said fitting having a radially extending flange secured to the housing around the aperture, and
   D. at least one duct in the housing and in good thermal conductive relationship with the fitting for providing a flow path for a cooling medium for cooling the fitting,
      i. said duct comprising a groove formed in the housing around the aperture,
      ii. said duct having inlet and outlet ports, and
      iii. a cover plate for closing the open face of the groove except for inlet and outlet ports.
3. A dynamo electric machine including
   A. an enclosing housing having at least one aperture therein,
   B. at least one winding terminal for carrying alternating current to or from the machine,
   C. said winding terminal comprising
      i. an electrically insulated conductor extending through the aperture,
      ii. a metal fitting securing and locating the conductor in the aperture,
      iii. said fitting having a bore through which the conductor extends in a gas-tight manner,
      iv. said fitting having a radially extending flange secured to the housing around the aperture,
   D. an annular member secured to the flange of the fitting and with the flange forming a duct in good thermal conductive relationship with the fitting for providing a flow path for a cooling medium for cooling the fitting, and
   E. inlet and outlet ports for the duct.
4. A dynamo electric machine including
   A. an enclosing housing having at least one aperture therein,
   B. at least one winding terminal for carrying alternating current to or from the machine,
   C. said winding terminal comprising
      i. an electrically insulated conductor extending through the aperture,
      ii. a metal fitting securing and locating the conductor in the aperture,
      iii. said fitting having a bore through which the conductor extends in a gas-tight manner,
      iv. said fitting having a radially extending flange secured to the housing around the aperture, and
   D. an annular member secured to the housing around the aperture and with the housing forming a duct in good thermal conductive relationship with the fitting for providing a flow path for a cooling medium for cooling the fitting, and
   E. inlet and outlet ports for the duct.
5. A dynamo electric machine including
   A. an enclosing housing having at least one aperture therein,
   B. at least one winding terminal or carrying current to or from the machine,
   C. said winding terminal comprising
      i. an electrically insulated conductor extending through the aperture,
      ii. a metal fitting securing and locating said fitting in the aperture,
      iii. said fitting having a bore through which the conductor extends in a gas-tight manner,
      iv. said fitting having a radially extending flange secured to the housing around the aperture, and
   D. means associated with the fitting and providing at least one duct therein for the passage of a cooling medium.
      i. said duct comprising a groove formed in the flange part of the fitting,
      ii. said duct having inlet and outlet ports, and
      iii. a cover plate for closing the open face of the groove except for inlet and outlet ports.

* * * * *